United States Patent

Takechi et al.

Patent Number: 5,700,210
Date of Patent: Dec. 23, 1997

[54] RACKET FRAME AND PROCESS FOR PRODUCING THE SAME

[75] Inventors: Kenjiro Takechi; Yasuhiro Ishigaki; Hitomi Kojo, all of Hamamatsu, Japan

[73] Assignee: Yamaha Corporation, Japan

[21] Appl. No.: 629,498

[22] Filed: Apr. 10, 1996

[30] Foreign Application Priority Data

Apr. 20, 1995 [JP] Japan .................. 7-095418

[51] Int. Cl.$^6$ ............................. A63B 49/10
[52] U.S. Cl. .............. 473/535; 273/DIG. 22; 273/DIG. 23; 428/375
[58] Field of Search ............ 473/535, 524, 473/561, 319, 513, 180; 273/DIG. 22, DIG. 23; 428/373, 375, 377

[56] References Cited

U.S. PATENT DOCUMENTS

| | | | |
|---|---|---|---|
| 3,910,578 | 10/1975 | Brine, Jr. | 473/513 |
| 4,283,050 | 8/1981 | Nagamoto | 473/535 |
| 4,357,013 | 11/1982 | Fernandez et al. | 473/535 |
| 4,360,202 | 11/1982 | Lo | 473/535 |
| 5,322,249 | 6/1994 | You | 473/535 X |
| 5,482,774 | 1/1996 | Miyamoto et al. | 473/535 X |

FOREIGN PATENT DOCUMENTS

| | | | |
|---|---|---|---|
| 212014 | 3/1987 | European Pat. Off. | 473/180 |
| 2910424 | 9/1980 | Germany | 473/180 |
| 3636645 | 4/1987 | Germany | 473/180 |

*Primary Examiner*—Raleigh W. Chiu
*Attorney, Agent, or Firm*—Ostrolenk, Faber, Gerb & Soffen, LLP

[57] ABSTRACT

A racket frame, which has a frame main body 12 made of a fiber reinforced plastic, an ionomer film 13 covering the frame main body 12, and a coating film 15 formed over the ionomer film 13, is provided with a gas permeable porous material film 14 interposed between the ionomer film 13 and the coating film 15 so as to reduce voids inside the frame main body 12 and between the frame main body 12 and the ionomer film 13. Since voids are reduced inside the frame main body 12 and between the frame main body 12 and the ionomer film 13, and since the ionomer film 13 is reinforced with the gas permeable porous material film 14, the racket frame has an excellent mechanical strength. Adhesion between the frame main body 12 and the ionomer film 13 is excellent. Adhesion between the gas permeable porous material film 14 and the coating film 15 is good.

1 Claim, 1 Drawing Sheet

RACKET FRAME AND PROCESS FOR PRODUCING THE SAME

BACKGROUND OF THE INVENTION

1. Field of the Invention

The present invention relates to a racket frame such as a tennis racket and a badminton racket.

2. Description of Related Art

A conventional racket frame, as shown in FIG. 2, is obtained by winding a fiber reinforced prepreg 2, in which an epoxy resin is used as a matrix resin, around a core material 1 which is made of a rigid polyurethane foam or the like; covering the surface of the fiber reinforced prepreg 2 with a plastic film 3 such as polyurethane having a solubility parameter of 9.0 to 11.5; and molding the resulting object by heating under pressure.

The above technique has been considered to be effective in giving the racket frame a superior toughness and a good impact impression since the frame main body, which is made by setting the fiber reinforced prepreg 2, and the plastic film 3 have been believed to be in a unitary body in which they adhere closely to each other.

However, the racket frame obtained accordingly was found not to exhibit sufficient effects as expected; that is, adhesion between the plastic film 3 and the frame main body is not always desirable, and adhesion between the plastic film 3 and a coating film to be formed thereon is not good.

SUMMARY OF THE INVENTION

The object of the present invention is to discover a plastic which has a satisfactory adhesion with a frame main body made of an FRP and with a coating film, and to provide a process for producing a racket frame using such a plastic.

Accordingly, it was discovered that adhesion between a frame main body and a coating film could be improved when an ionomer film was used as the plastic film 3 in order to attain the above object.

However, there were cases in which the thus-obtained racket frame may have bubbles remaining inside the fiber reinforced prepreg or between the prepreg and the ionomer film. In such a case, the bubbles may remain after molding as voids inside the frame main body made of the fiber reinforced plastic or between the frame main body and the ionomer film. Thus, the disadvantageous reduction in strength is left unsolved.

Accordingly, the inventors of the present invention have directed their attention to release of bubbles, remaining inside the fiber reinforced prepreg or between the prepreg and the ionomer film, to the outside of the mold. Various studies and researches have resulted in the following findings.

First, it was discovered that it was possible to release the bubbles to the outside of the ionomer film by providing numerous holes through the ionomer film. However, pinholes or voids are formed on the surface of the ionomer film since bubbles remain between the ionomer film and the inner surface of the mold, or since the synthetic resin liquid with the bubbles flows out through the holes and is set as it contains the bubbles.

Furthermore, it was found that even if the bubbles migrate to the surface of the ionomer film, the bubbles cannot be released to the outside of the mold, since the ionomer film, which is softened during heating under pressure, closely adheres to the inner surface of the mold, and thus the bubbles cannot reach a joining portion of the mold to pass through.

Accordingly, it was discovered that by interposing a paper or a nonwoven fabric between the ionomer film and the inner surface of the mold, the bubbles can be released to the outside of the mold by moving through the space between fibers which constitute the paper or nonwoven fabric and by passing through the joining portion of the mold.

That is to say, with regard to a racket frame according to the present invention, having a frame main body made of a fiber reinforced plastic, an ionomer film which covers the frame main body, and a coating film formed on the ionomer film, the above object is attained by interposing a gas permeable porous material film between the ionomer film and the coating film.

Furthermore, with regard to a process for producing a racket frame according to the present invention, the above object is attained by winding around a core material a prepreg in which a reinforcing fiber is impregnated with a thermosetting resin, covering the prepreg with an ionomer film, covering the surface of the ionomer film with a gas permeable porous material film, placing the resulting object in a mold, heating it under pressure to obtain a molded body, and applying a coating material to the molded body.

In the racket frame of the present invention, the surface of the ionomer film is covered with the gas permeable porous material film. Therefore, even if a bubble exists inside the fiber reinforced prepreg or between the prepreg and the ionomer film, the bubble can be released to the outside of the mold by moving through the gas permeable porous material film and by passing through a joining portion of the mold. Accordingly, voids rarely remain inside the frame main body and between the frame main body and the ionomer film. In addition, since the ionomer film is reinforced with the gas permeable porous material film, the racket frame has a superior mechanical strength.

Moreover, since the frame main body made of an FRP is covered with the ionomer film, the frame main body and the ionomer film adhere closely to each other. Therefore, the racket frame does not have defects such as voids and pinholes; thus, the racket frame has a high mechanical strength as well as flexibility, and gives a preferable impact impression. In addition, since the molded body has a smooth surface, preparation of the ground for the later step of applying coating material is not necessary, and the coating film can be made thin.

Furthermore, since an ionomer resin which constitutes the ionomer film soaks into the gas permeable porous material film while the main body is formed by covering the surface of the ionomer film with the gas permeable porous material film and by heating under pressure, the gas permeable porous material film adheres closely to the coating film which is formed by applying a coating material on the gas permeable porous material film.

DESCRIPTION OF THE PREFERRED EMBODIMENTS

In the following, examples of the present invention are explained with a view to a better understanding of the present invention. The examples simply describes some embodiments of the present invention; thus, the present invention is not limited to the examples. The present invention is arbitrarily modifiable within its scope.

Figure 1:
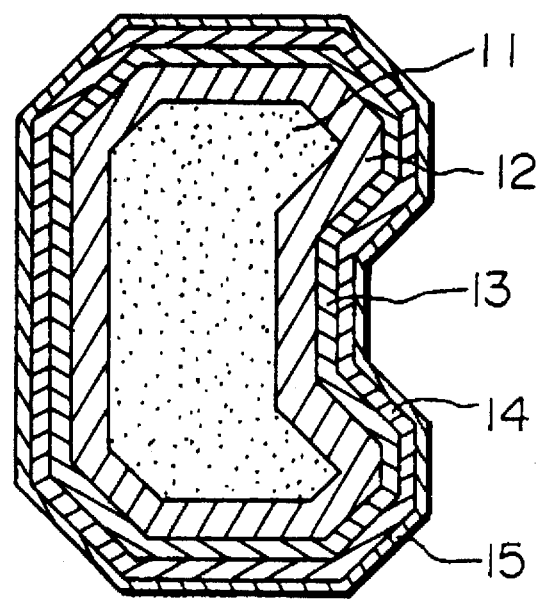
FIG. 1 is a schematic sectional view of an example of a racket frame according to the present invention.
Figure 2:
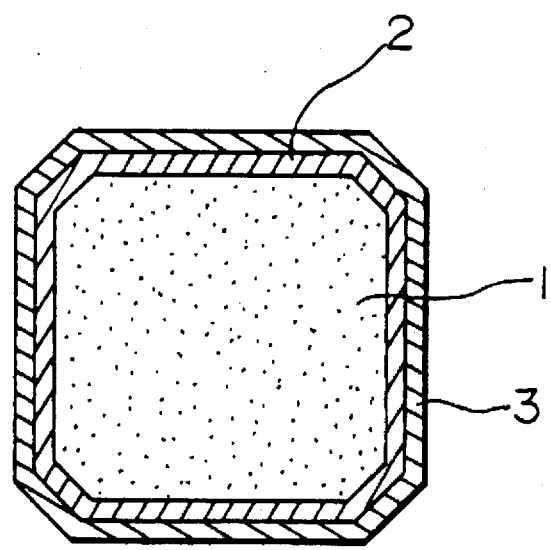
FIG. 2 is a schematic sectional view of an example of a conventional racket.

FIG. 1 shows an example of a racket frame according to the present invention, in which the racket frame is constructed from a core material 11, a frame main body 12 made of an FRP, an ionomer film 13, a gas permeable porous material film 14, and a coating film 15.

The core material 11 is a rod made of a rigid polyurethane foam, a styrene foam, or the like, which serves, during formation of the racket frame, as a core around which a prepreg will be laminated by winding.

Furthermore, the frame main body 12 is a hollow tube made of an FRP obtained by laminating over and winding around the core material 11 a prepreg in which a reinforcing fiber is impregnated with an unset liquid of a thermosetting resin as a matrix resin and by setting the prepreg by heating under pressure.

As the aforementioned reinforcing fiber, a carbon fiber, a glass fiber, a boron fiber, an alumina fiber, a silicon carbide fiber, an aramid fiber, a stainless steel fiber, or the like, can be employed, among which a carbon fiber is most preferable.

As the aforementioned thermosetting resin, an epoxy resin, an unsaturated polyester resin, a diallyl phthalate resin, a phenol resin, or the like, can be employed, among which an epoxy resin is most preferable.

The ionomer film 13 adheres by fusion to the entirety of the frame main body 12 made of an FRP, and it covers the frame main body 12 so as to form a unitary body. That is to say, the ionomer film 13 melts during molding the frame main body 12 and adheres thereto. The thickness of the ionomer film 13 may be within the range of 0.01 to 0.2 mm, and preferably within the range of 0.05 to 0.1 mm.

An ionomer resin used in the ionomer film 13 contains as its main component a copolymer of ethylene and acrylic acid. Carboxyl groups in a molecule of the copolymer are ionically bonded with cations of a metal such as sodium, potassium, magnesium, and zinc. An ionomer resin marketed under the trade name of "SURLYN" or "HIMILAN", or the like, can be employed. As the ionomer resin, one having a melting point of 100° to 120° C. is preferable. It is desirable that the ionomer resin melt during the heat molding of the prepreg, which will be explained below.

The gas permeable porous material film 14 covers the entirety of the ionomer film 13, which covers the frame main body 12, so as to form a unitary body. This gas permeable porous material film 14 is soaked with the ionomer resin which constitutes the ionomer film 13 during the molding of the frame main body 12 and the ionomer film.

As the gas permeable porous material film 14, a paper, a nonwoven fabric, a glass cloth, or the like, can be used. The thickness of the gas permeable porous material film 14 may be in the range of 0.01 to 0.1 mm, and preferably in the range of 0.02 to 0.07 mm.

The coating film 15, which is provided on the gas permeable porous material film 14, is a coating film having a thickness in the range of 50 to 150 μm which is obtained by applying a coating material such as one made of an unsaturated polyester resin, a urethane resin, an acrylic resin, an epoxy resin, or the like.

In the following, a process for producing the above racket frame will be explained.

First, a fiber reinforced prepreg is prepared and is cut to predetermined shape and size. A predetermined number of sheets of the fiber reinforced prepreg is wound around a core material 11. Then, the entire surface of the resulting object is covered by an ionomer film 13. More specifically, a method such as a lap winding of a wide tape-shaped ionomer film 13 may be carried out.

Then, the entire surface of the ionomer film 13 which is wound around the core material 11 is covered by a gas permeable porous material film 14. More specifically, a method such as a lap winding of a wide tape-shaped gas permeable porous material film 14 may be carried out.

Subsequently, the resulting object is placed in a mold having a cavity in a shape of a racket frame, and is heated at a predetermined temperature under a predetermined pressure, by which a molded body having a shape of a racket frame is obtained as the thermosetting resin in the prepreg is set. The temperature for the heating under pressure is preferably at the melting point of the ionomer film 13 or higher. Accordingly, bubbles which may exist inside the fiber reinforced prepreg or between the prepreg and the ionomer film 13 can be released to the outside of the mold by moving through the gas permeable porous material film 14 and by passing through a joining portion of the mold. Accordingly, voids which remain inside the frame main body 12 and between the frame main body 12 and the ionomer film 13 can be reduced. Moreover, since the gas permeable porous material film 14 is soaked with the ionomer resin, the ionomer film 13 is reinforced by the gas permeable porous material film 14. Furthermore, adhesion between the set prepreg and the ionomer film 13 is excellent since they were melted to form a unitary body.

Next, the surface of the molded body is coated by the aforementioned coating material so as to form a coating film 15. Since the frame main body is covered with the ionomer film 13, the surface of the molded body is smooth, and preparation of the ground for the coating step is unnecessary. In addition, since the surface does not have pinholes or voids, the thickness of the coating film can be made thin. Furthermore, since the gas permeable porous material film 14 is soaked with the ionomer resin, adhesion between the gas permeable porous material film 14 and the coating film 15 is excellent.

In addition, there is an alternative production process, in which a molded body is obtained by employing a tube made of a flexible material such as silicone rubber as the core material; laminating over the tube a prepreg, an ionomer film 13, and a gas permeable porous material film 14; thereafter, placing the resulting object in a mold; sending a pressurized fluid such as pressurized air into the tube by using the pressure; and heating while applying pressure inside the tube.

According to the above process for producing a racket frame, the surface of the ionomer film 13 is covered by the gas permeable porous material film 14; therefore, bubbles which may exist inside the fiber reinforced prepreg or between the prepreg and the ionomer film 13 can be released to the outside of the mold by moving through the gas permeable porous material film 14 and by passing through a joining portion of the mold. Accordingly, voids which remain inside the frame main body 12 and between the frame main body 12 and the ionomer film 13 can be reduced. Moreover, since the ionomer film 13 is reinforced with the gas permeable porous material film 14, the racket frame has a superior mechanical strength.

Furthermore, since the entirety of the frame main body 12 which is made of an FRP is covered by the ionomer film 13, the frame main body 12 and the ionomer film 13 adhere very closely to each other. Accordingly, the racket frame does not have defects such as voids and pinholes; thus, the racket frame has a high mechanical strength as well as flexibility, and gives a preferable impact impression. In addition, since the molded body has a smooth surface, preparation of the ground for the later step of applying a coating material is unnecessary, and the coating film 15 can be made thin.

Furthermore, since the molded body is formed by covering the surface of the ionomer film 13 with the gas permeable porous material film 14, and then by heating under pressure, the ionomer resin which constitutes the ionomer film 13 soaks into the gas permeable porous material film 14. Therefore, adhesion of the coating film 14 obtained by applying a coating material on the gas permeable porous material film 14 after the molding step is satisfactory.

In the following, concrete examples are explained.

EXAMPLE 1

A prepreg having a fiber content of 60% by volume was prepared using as a reinforcing fiber a cloth made of a PAN-precursor carbon fiber having a diameter of 6.5 μm, and using as a matrix resin a bisphenol A-type epoxy resin.

Three sheets of the prepreg were formed into a laminate. On one side of the laminate, an ionomer film (thickness: 0.07 mm) was laminated. Then, on the surface of the ionomer film, a paper (thickness: 0.02 mm) or a nonwoven fabric (thickness: 0.02 mm) as a gas permeable porous material film was laminated so as to form a laminated prepreg (Samples 1 and 2, respectively). In addition, for the purpose of comparison, a laminated prepreg (Sample 3) was prepared, which was similar to the above laminated prepregs except that no gas permeable porous material film was laminated on the surface of the ionomer film.

Each of these laminated prepregs was placed in a mold, and heated to a temperature of 135° C. under a pressure of 1.2 MPa for 20 minutes, by which a plate-shaped molded object was obtained.

With respect to each molded object, occurrence of voids inside and the mechanical strength thereof were measured. In the inspection, mechanical strength was measured using an Instron tester in line with the bending test method for carbon fiber reinforced plastic as regulated by JIS (Japan Industrial Standard) K-7074-88. The results of the inspection are shown in Table 1.

In addition, each molded object was cut into ½ pieces, and a polyurethane resin coating material was applied to the front surface (on the porous material film side for Samples 1 and 2; on the ionomer film side for Sample 3) of one of the ½ pieces. The coating material was set and it formed a coating film having a thickness of 20 to 70 μm.

Then, adhesion between the ionomer film and the set prepreg (hereinafter referred to as "adhesion A") and adhesion between the front surface of the molded object and the coating film (hereinafter referred to as "adhesion B") were evaluated by carrying out a cross-cut adhesion test, in which an adhesive cellophane tape is attached to and detached from the front surface of each of the molded objects with and without coating film. The results are shown in Table 1.

In addition, occurrence of voids were inspected with regard to voids appearing on the front surface of the molded object obtained. The results are shown in Table 1.

TABLE 1

| Sample No. | Gas permeable porous material film | Adhesion A | Adhesion B | Occurrence of voids | Mechanical strength (kgf/mm$^2$) |
| --- | --- | --- | --- | --- | --- |
| 1 | paper | ○ | ○ | ○ | ≧170 |
| 2 | nonwoven cloth | ○ | ○ | ○ | ≧170 |
| 3 | none | ○ | ○ | Δ | 150 |

Evaluation of adhesion in Table 1 was carried out by observing peeled pieces on the adhesive cellophane tape, in which the symbol ○ represents "5/100 or less" according to the cross-cut adhesion test; and the symbol X represents "more than 5/100".

In the evaluation of occurrence of voids, the symbol ○ represents "5 voids or less", the symbol Δ represents "voids more than 5 and less than 10", and the symbol X represents "10 voids or more".

Mechanical strength was calculated by the following formula (i).

$$\alpha = 3PL/2bh^2 \qquad (i)$$

(In the formula (i), G represents the bending strength (kgf/mm$^2$), P represents the load (kgf) at fracture of the test piece, L represents the distance (mm) between the supports, b represents the width (mm) of the test piece, and h represents the thickness (mm) of the test piece.)

As is clear from the results in Table 1, it was discovered that in comparison with a molded object in which no gas permeable porous material film is laminated on the surface of an ionomer film (Sample 3), a molded object in which a gas permeable porous material film is laminated on the surface of an ionomer film (Samples 1 and 2) has less voids and has a superior mechanical strength.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by, persons of ordinary skill in the art having reference to this description. It is contemplated that all such changes and additional embodiments are within the spirit and true scope of the invention as claimed.

We claim:

1. A racket frame having a frame main body, an ionomer film covering the frame main body, and a coating film formed over the ionomer film; the frame main body containing a fiber reinforced plastic; the racket frame comprising a gas permeable porous material film interposed between the ionomer film and the coating film.

* * * * *